(12) United States Patent
Oathout

(10) Patent No.: US 9,017,135 B2
(45) Date of Patent: Apr. 28, 2015

(54) GAME CALLING DEVICE HAVING VARIED PITCH AND INTENSITY

(76) Inventor: David Eugene Oathout, Caroga Lake, NY (US)

( * ) Notice: Subject to any disclaimer, the term of this patent is extended or adjusted under 35 U.S.C. 154(b) by 136 days.

(21) Appl. No.: 13/585,347

(22) Filed: Aug. 14, 2012

(65) Prior Publication Data

US 2014/0051323 A1 Feb. 20, 2014

(51) Int. Cl.
*A63H 5/00* (2006.01)
*A01M 31/00* (2006.01)

(52) U.S. Cl.
CPC ........... *A01M 31/004* (2013.01); *Y10T 29/4957* (2015.01)

(58) Field of Classification Search
USPC .......................................... 446/207, 208, 209
See application file for complete search history.

(56) References Cited

U.S. PATENT DOCUMENTS

| 1,052,525 A | 2/1913 | Smith |
| 2,072,786 A | 3/1937 | Yager |
| 2,470,823 A | 3/1949 | Luch |
| 2,544,370 A | 3/1951 | Walther |
| 3,020,675 A | 2/1962 | Boecker |
| 3,579,903 A | 5/1971 | Stewart |
| 4,030,241 A | 6/1977 | Gallagher |
| 4,179,845 A | 12/1979 | Jacob |
| 4,637,154 A | 1/1987 | Laubach |
| 4,642,065 A | 2/1987 | Whedon et al. |
| 4,850,925 A | 7/1989 | Ady |
| 4,940,451 A | 7/1990 | Leady |
| 4,950,201 A | 8/1990 | Sceery |
| 5,222,903 A | 6/1993 | Parrott et al. |
| 5,577,946 A | 11/1996 | Oathout |
| 5,643,039 A | 7/1997 | McIntyre |
| 6,039,627 A | 3/2000 | Forbes et al. |
| 6,106,357 A | 8/2000 | Weiser |
| 6,152,798 A | 11/2000 | Raburn |
| 6,234,860 B1 | 5/2001 | Cook |
| 6,547,627 B1 | 4/2003 | Oathout |
| 7,011,563 B2 | 3/2006 | Ady et al. |
| 7,083,492 B1 | 8/2006 | Morocco et al. |
| 7,637,795 B1 | 12/2009 | Dukart |
| 2010/0233933 A2 | 9/2010 | Drury |

OTHER PUBLICATIONS

K&H Translator Deer Call, http://www.yeoldearcheryshoppe.com/translator-deer-call-p-13923.html, 2012.
Atkenson, et al., "Vocalization of White-Tailed Deer," 120 The American Midland Naturalist 195 (1988).

*Primary Examiner* — John Ricci
(74) *Attorney, Agent, or Firm* — Oliff PLC

(57) ABSTRACT

A game calling device including a mouthpiece having inlet and outlet portions and holes between the inlet and outlet portions, whereby sounds having varied pitch and intensity can be generated. The game calling device also includes an inner tubular member that at least partially houses a reed and configured to be selectively positioned on the axial direction of the reed so that the emitted sound can be varied based at least on the position of the inner tubular member along the reed and thereby allowing the game calling device to be used hands-free.

24 Claims, 5 Drawing Sheets

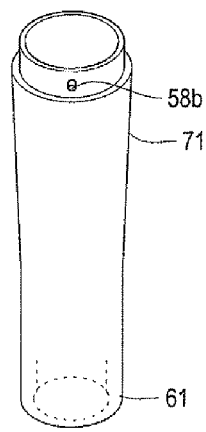
FIG. 1A
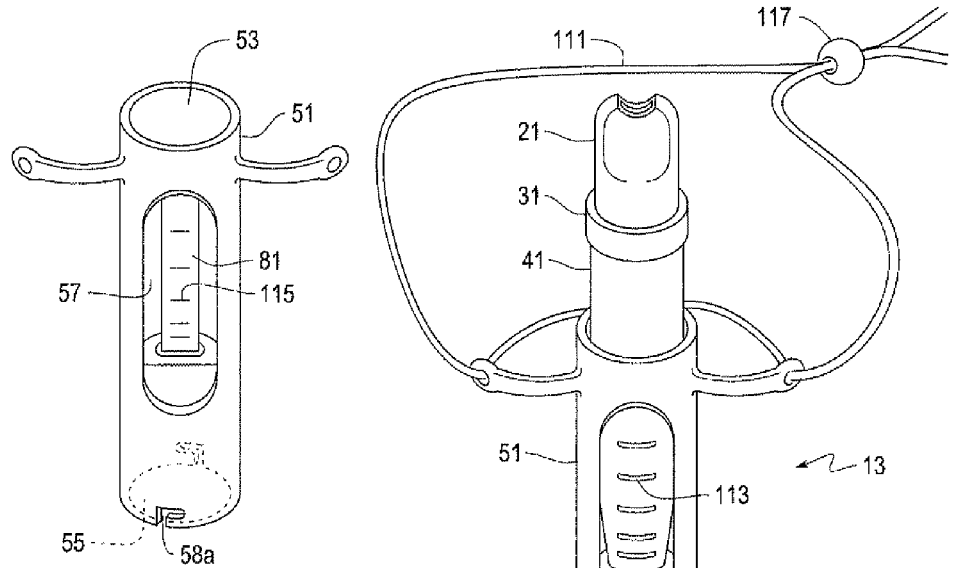
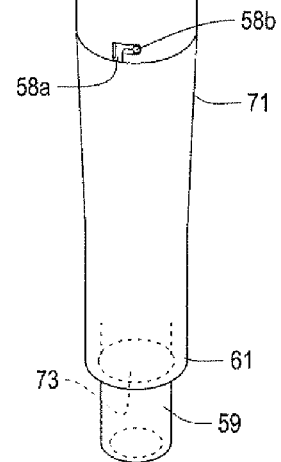
FIG. 1B
FIG. 2

GAME CALLING DEVICE HAVING VARIED PITCH AND INTENSITY

BACKGROUND

The present invention relates to game calling devices, and in particular, to a game calling device that can produce selective sounds having varied pitch and intensity without an external application of force or pressure, and a method of generating selective sounds having varied pitch and intensity.

Game calling devices for mammals and predators are known. In particular, devices known as "grunt tubes" are used to simulate the grunts, snorts, bleats and other sounds produced by animals such as, for example, species of deer. Deer sounds are described by Atkenson et al. in "Vocalizations of White Tail Deer," 120 The American Midland Naturalist 195 (1988). Hunters and wildlife enthusiasts use grunt tubes to attract deer and other animals.

Grunt tubes generally include a tubular member through which air passes over a reed supported within the tubular member. The passing air excites the reed supported within the tubular member. In particular, the passing air excites the reed and causes it to vibrate and to produce sounds.

SUMMARY

The known devices fail to provide the user with the capability of producing hands-free selective sounds having varied pitch and intensity, as well as, for example, sounds of varied pitch and intensity without an external application of force or pressure.

The exemplary embodiments provide a game calling device that is capable of producing selective sounds having varied pitch and intensity without an external application of force or pressure so as to provide a hands-free game calling device configured to emit various sounds without having to be manipulated by the user.

According to one embodiment, there is provided a game calling device with a mouthpiece including an inlet portion configured for air to enter the mouthpiece, an outlet portion that emits a sound when the air exits the mouthpiece and a body between the inlet portion and the outlet portion, the body defining a plurality of openings, wherein the sound emitted varies based on at least one of a number of the openings, a size of the openings, and a positioning of the openings on the body.

According to another embodiment, there is provided a game calling device having an external tubular member having an outlet, a reed disposed within the external tubular member, that vibrates in response to passing air, and an inner tubular member adjustably disposed to at least partially house the reed. The game calling device has a first end and a second end, the first end being an inlet that allows air to enter the inner tubular member, wherein the air that enters the inner tubular member vibrates the reed and is expelled through the outlet of the external tubular member to emit a sound. The inner tubular member is configured to be selectively positioned along the axial direction of the reed so that the emitted sound varies based at least on the position of the inner tubular member along the reed.

In another embodiment, there is provided a method of varying sounds with a game calling device. The method includes sliding an inner tubular member of the game calling device along an axial direction of a reed to selectively positioning the inner tubular member at a specific position on the reed. The method further includes conveying air through the inner tubular member, thereby causing the reed to vibrate and to produce a sound based on the position of the inner tubular member on the reed that emanates from an outlet of the game calling device.

In yet another embodiment, there is provided a method of manufacturing a game calling device, including forming an internal tubular member and an external tubular member, positioning a reed in the external tubular member and positioning the inner tubular member to at least partially house the reed. The forming the inner tubular member includes: (1) forming an inlet that allows air to enter the inner tubular member; and (2) forming the inner tubular member to be adjustably positioned about the reed. Forming the external tubular member includes forming an outlet so that the air that enters the inner tubular member is expelled through the outlet to emit a sound.

BRIEF DESCRIPTION OF THE DRAWINGS

Various exemplary embodiments of a game calling device, process of varying sounds of a game calling device, and process of manufacture thereof will be described in detail with reference to the following drawings in which:

FIGS. 1A and 1B are perspective views of a reed positioned in a first external tubular member and a second external tubular member without a reed of an exemplary game calling device;

FIG. 2 is a perspective view of an exemplary game calling device with an attached mouthpiece, lanyard and clasp;

DETAILED DESCRIPTION OF THE EMBODIMENTS

Figure 3:
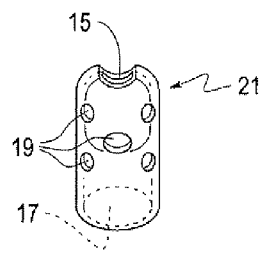
FIG. 3 is a perspective view of an exemplary mouthpiece for a game calling device.

As illustrated in FIG. 2, the game calling device 13 according to one embodiment includes a mouthpiece 21 connected to an inlet end 31 of an inner tubular member 41 that is at least partially positioned within a first external tubular member 51 having a first opening 53 and a second opening 55 (FIG. 1A) the second opening connected to a second external tubular member 71 (FIG. 1B).

The mouthpiece 21 has an inlet portion 15 and an outlet portion 17 (FIG. 3). The inlet portion 15 is configured to allow air to flow and enter the mouthpiece 21, and the outlet portion 17 emits a sound when the air exits the mouthpiece through the outlet portion 17.

The mouthpiece 21 may also have several holes 19, which may have different shapes and sizes, strategically positioned at various places around the mouthpiece 21, such as, for example, the side walls of the mouthpiece 21 (FIG. 3). The number, placement and size of the holes 19, enables the mouthpiece 21 to emit different sounds of varying pitch and intensity as air passes through the mouthpiece 21 from the inlet portion 15. The mouthpiece 21 may also be partially inserted into the mouthpiece of any known or later developed game calling device, as well as the game calling device 13 of the exemplary embodiment. In an embodiment, the mouthpiece 21 may be attached to the mouthpiece of the known or later developed game calling device, as well as the game calling device 13 of the exemplary embodiment by a variety of methods such as, for example, friction, adhesive, being integrally formed as a unitary structure, etc. In another embodiment, the hole or holes 19 of the mouthpiece 21 may be selectively blocked to manipulate the air passing through the known or later developed game calling device, as well as the game calling device 13 of the exemplary embodiment. In yet another embodiment, the air traveling through the known or later developed game calling device, as well as the game calling device 13 of the exemplary embodiment can be restricted from exiting the game calling device to eliminate all, limit or regulate the flow of air and, thus, force the flow of air through selected or exposed holes on the mouthpiece 21 and, thus, create a useful sound that attracts game.

Figure 4:
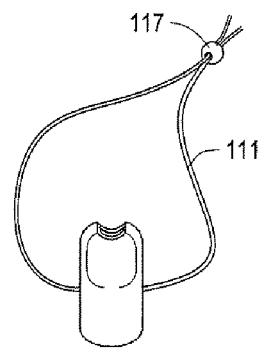
FIG. 4 is a perspective view of an exemplary mouthpiece of a game calling device with a lanyard attached.

The same mouthpiece 21 may also be inserted into a barrel end 61 of a second external tubular member 71. Additionally, the mouthpiece 21 may be conveniently attached to a variety of objects by means of the holes 19 and a lanyard 111 (FIG. 4) or string, such as, for example, a finger, neck, wrist, gloves, zipper, jacket, button(s), bows, guns, sporting equipment and various other articles of clothing and objects. A clasp 117 may also be used to hold the lanyard 111 together (FIG. 4). However, in an alternate embodiment, a continuous band, or any other object that can secure the mouthpiece to a user, may be used in place of the lanyard 111.

Figure 5:
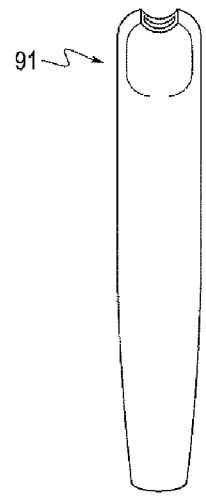
FIG. 5 is a perspective view that illustrates a unitary body of an inner tubular member and a mouthpiece of an exemplary game calling device.
Figure 8:
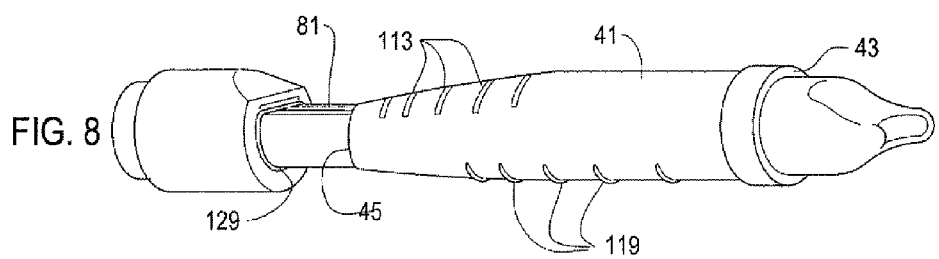
FIG. 8 is a side view of the inner tubular member partially housing a reed and plate member of an exemplary game calling device.

In an embodiment, the mouthpiece 21 may be attached to an end of the inner tubular member 41 such that the mouthpiece 21 covers at least a portion of the exterior surface of the inner tubular member 41. In another embodiment, the mouthpiece 21 may be attached to an end of the inner tubular member 41 (FIG. 8) such that at least a portion of the outlet portion 17 of the mouthpiece 21 is covered by at least a portion of the inner tubular member 41 (FIGS. 2 and 8). In an embodiment, the mouthpiece 21 may be integrally formed with the inner tubular member 41 to form a unitary body 91 (FIG. 5). Additionally, as illustrated in FIGS. 2 and 8, the inner tubular member 41 may be adjustably disposed to at least partially house a reed 81 that allows for hands-free use of the game calling device 13.

The inner tubular member 41 may have a first end 43 and a second end 45, the first end 43 being an inlet that allows air to enter the inner tubular member 41 and travel toward the second end 45 (FIG. 8). Further, the inner tubular member 41 may be positioned along an axial direction of the reed 81 (FIG. 8) so that the emitted sound varies based at least on the position of the inner tubular member 41 along the reed 81. Such a configuration also allows the inner tubular member 41 to be removable.

The inner tubular member 41 may be of various shapes and sizes. In one embodiment the inner tubular member 41 may be conical or cylindrical. In particular, the inner tubular member 41 may also be tapered between the first end 43 and the second end 45.

The inner tubular member 41 may be made of various materials and is not particularly limited to any specific material. For instance, the inner tubular member 41 may be made of a material such that when formed, the inner tubular member 41 is flexible or rigid. The materials used to form the inner tubular member 41 also allows at least a portion of the inner tubular member 41 to be turned over onto itself such that when the mouthpiece 21 is attached to the inner tubular member 41, the portion of the inner tubular member 41 that is turned over onto itself at least partially covers the outlet portion 17 and the sidewalls of the mouthpiece 21, thereby increasing the strength of the attachment between the inner tubular member 41 and the mouthpiece 21 (FIG. 8).

Figure 9A:
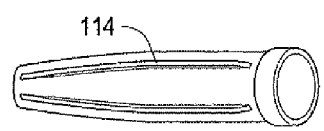
FIGS. 9A-9D are perspective views of various embodiments of ridges and attaching portions arranged on an inner tubular member of a game calling device.
Figure 9C:
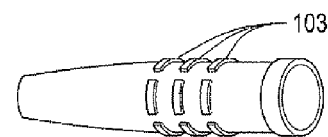
Figure 9B:
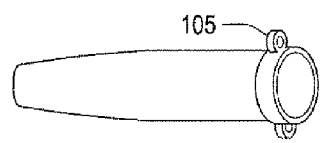
Figure 9D:
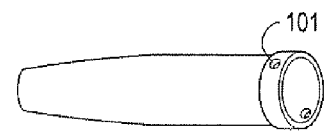

In an alternate embodiment, the inner tubular member 41 may include convex or concave guide ridges 114 (FIG. 9A) and attaching portions for attaching the inner tubular member 41 to a user, articles of clothing or other objects. The attaching portions may be in a variety of forms such as, for example, the form of holes 101, bumps 103 or protruding ears 105 such that a lanyard 111 or other items, such as a string, can be attached to the inner tubular member 41 (FIGS. 9B-9D). Such attaching portions, for example, protruding ears 105, may also be included in the exterior surface of the first external tubular member 51, as shown in (FIGS. 1A and 2).

The external surface of the inner tubular member 41 may include indicator marks 113 for placement of the inner tubular member 41, which will provide for designating different types of sounds that can be emitted from the game calling device 13 (FIG. 8). The inner tubular member 41 may also include partially raised portions 119 to assist in keeping the inner tubular member 41 frictionally positioned within the first external tubular member 51 and stabilizing the inner tubular member 41 on the reed 81 (FIG. 8). The raised portions 119 may also assist the user in determining the position of the internal tubular member 41 with respect to the reed 81, which will provide for different types of sounds.

Figure 7:
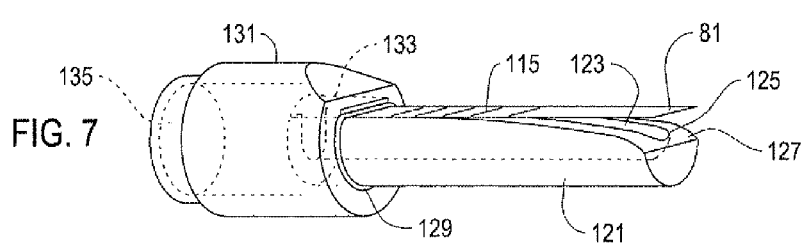
FIG. 7 is a side view of the reed support member, plate member and reed of an exemplary game calling device.

In an embodiment, the reed 81 is disposed within the first external tubular member 51 in alignment with the second opening 55 of the first external tubular member 51 (FIG. 1A). The reed 81 may be a thin strip of a flexible material, such as, for example, plastic or MYLAR. The dimensions of the reed 81 and the material of which it is made may be determined according to the sound characteristics desired to produce with the game calling device 13. As illustrated in FIG. 7, the reed 81 extends substantially the length of the first external tubular member 51. The reed 81 may also have indicator marks 115 that designate the various sounds that can be emitted from the game calling device 13.

Figure 10:
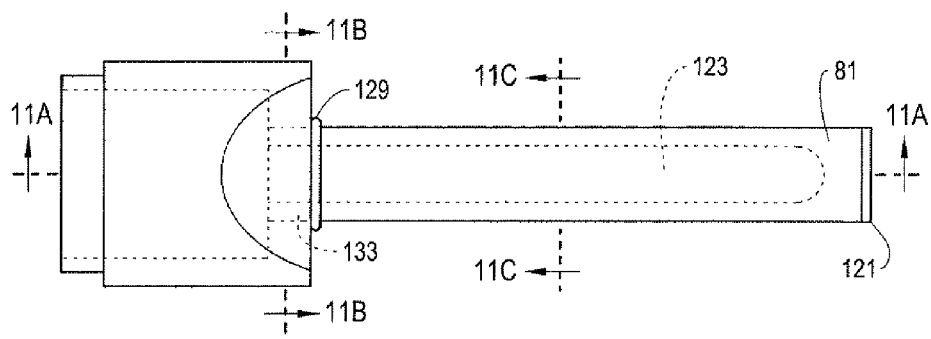
FIG. 10 is a top view of the exemplary game device of FIG. 7.
Figure 11A:
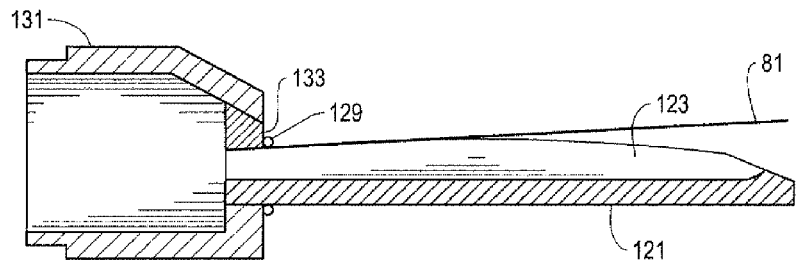
FIG. 11A is a transverse cross-sectional view along the line 11A-11A of the exemplary game calling device of FIG. 10.
Figure 11B:
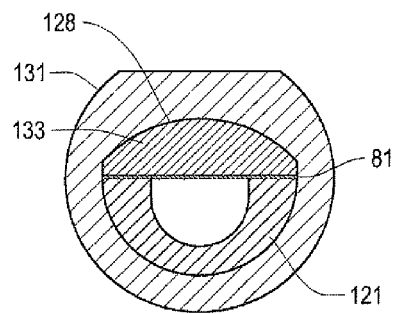
FIG. 11B is a transverse cross-sectional view along the line 11B-11B of the exemplary game calling device of FIG. 10.
Figure 11C:
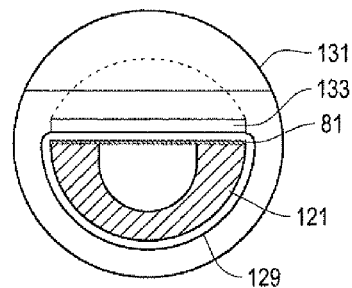
FIG. 11C is a transverse cross-sectional view along the line 11C-11C of the exemplary game calling device of FIG. 10.

The reed 81 is supported by a plate member 121 (FIG. 7), and the reed 81 and the plate member 121 are secured to reed support member 131 by a wedge 133 (FIG. 11A-11C). As illustrated in FIG. 7, the length of the plate member 121 is at least as great as the length of the reed 81. Depending on the desired sound characteristics, different plate member 121 and reed 81 configurations can be used. FIGS. 11A-11C illustrate transverse cross-sections along lines 11A-11A, 11B-11B and 11C-11C of FIG. 10, respectively, of the reed 81, plate member 121, reed support member 131 and wedge 133.

The plate member 121 may have a substantially semicircular cross-section (FIGS. 7 and 11A-11C). An upper side of the plate member 121 may be substantially flat that tapers toward an end 127 and includes a channel 123 through which air is conveyed by the user (FIGS. 7 and 11A). The channel 123 extends through a front (i.e., downstream) surface of the plate member 121 and terminates at a groove end wall 125 near a rearward (i.e., upstream) portion of the plate member 121 (FIG. 7). The channel 123 extends along an axial direction of the plate member 121. The reed 81 is also disposed over the channel 123 of the plate member 121 (FIGS. 7, 10 and 11A). Further, as shown in FIG. 7, the rearward end of the plate member 121 is tapered to have a reduced profile to allow the reed 81 to vibrate freely. Similarly, the forward end of the plate has a reduced profile such that the plate member 121 can be inserted in the reed support member 131.

Figure 6:
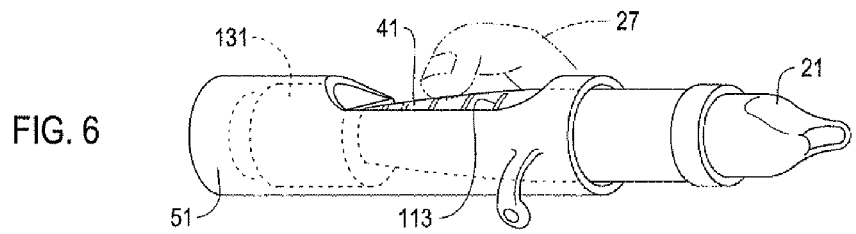
FIG. 6 is a perspective view of the inner tubular member positioned in the first external tubular member of an exemplary game calling device and a finger pressing down on the internal tubular member.

The reed support member 131 may be substantially cylindrical and dimensioned to fit snugly within the first external tubular member 51 (FIGS. 1, 2 and 6). The reed support member 131 also has an opened end 135 from which air passes and sounds are emitted. As assembled, a forward face of the reed support member 131 is flush with the second opening 55 of the first external tubular member 51 (FIGS. 1A and 6). The reed support member 131 includes a bore 128 shaped to receive the plate member 121, reed 81 and wedge 133 and the rearward (i.e., upstream) portion of the reed support member 131 is chamfered (FIGS. 7 and 8).

The reed 81 is secured by aligning it over the upper side of the plate member 121 above the channel 23 and securing the reed, for example, within a flexible O-ring 129 placed over one end of the reed 81 and the forward end of the plate member 121 (FIGS. 7 and 8). Although a flexible O-ring 129 is illustrated to show an attachment device, it is envisioned that any attachment device may be used that can secure the reed 81 to the plate member 121, while still allowing for vibration of the reed 81. The reed 81 and the plate member 121 may be inserted into the bore 128 of the reed support member 131 (FIGS. 11B and 11C). The wedge 133 of the support member 131 may be shaped to frictionally engage a remaining open portion of the bore 128 to secure the plate member 121 and the reed 81. Alternatively, the support member 131 may engage the bore 128 by any other attachment means that allows the plate member 121 and/or reed 81 to be secured. The reed support member 131 and wedge 133 may be separate members, with one or both formed of plastic. In an alternative embodiment, the reed support member 131 and the wedge 133 may be formed as a single piece (such as, for example, plastic), and the reed 81 and the plate member 121 are shaped to frictionally engage a remaining open portion of the bore 128. In either embodiment, a forward end of the wedge 133 may be chamfered similar to the forward end of the reed support member 131.

As illustrated in FIGS. 1A and 2, the reed support member 131, reed 81 and plate member 121 are disposed in the first external tubular member 51. The first external tubular member 51 may have a viewing hole 57 that allows a user to visualize the positioning of the inner tubular member 41 with respect to the reed 81 and also allows the user to press down on the inner tubular member 41 with an object, such as, for example, a finger 27, on or between the indicator marks 113 on the inner tubular member 41, to trap the reed 81 making different sounds (FIG. 6). This action of pressing down on or between the indicator marks 113 may allow a user to easily find the desired sound without having to move or slide the inner tubular member 41 along the axial direction of the reed 81. The second external tubular member 71 may also be attached to the first external tubular member 51 to assist in varying and/or amplifying the emitted sounds of the game calling device 13. An additional flexible and extendible tube 59 may also be attached to the barrel end 61 of the second external tubular member 71 (FIG. 2).

In an embodiment, the first external tubular member 51 and the second external tubular member 71 may be attached by first and second interlocking portion 58a and 58b on the first external tubular member 51 and the second external tubular member 71, respectively (FIGS. 1A and 1B). The first external tubular member 51 and the second external tubular member 71 may be locked together by aligning the first and second interlocking portions 58a and 58b such that the second interlocking portion 58b is positioned within the first interlocking portion 58a, and twisting either the first external tubular member 51 or the second external tubular member 71 to lock the first and second interlocking portion 58a and 58b together.

In operation, either the mouthpiece 21 or inner tubular member 41, together or separately, may be positioned against the mouth of a user or held in the lips or teeth of a user, which allows the user to use the game calling device 13 hands-free. Because the mouthpiece 21 has more than one hole for air to flow in or out of, the user can direct the flow and direction of the air by several means. For instance, flow of air into the mouthpiece 21 that is attached to a game calling device 13 may be rendered to have little or no effect as to the mouthpiece 21 as the holes 19 of the mouthpiece 21 may be covered by the inner wall of a mouthpiece of a different game calling device. Additionally, the mouthpiece 21 can be partially inserted into the mouthpiece of any known or later developed game calling device as well as the game calling device 13 of the exemplary embodiments that allows the hole or holes 19 in the mouthpiece 21 to create several useful effects of the air passing into the game calling device. Moreover, the air traveling through the game calling device can be restricted or stopped entirely from exiting the existing game calling device. This would have the desired effect of having all, limited or regulated flow effect, thus forcing the flow of air through selected or exposed holes creating useful sounds. Moreover, the holes 19 of the mouthpiece 21 may be at least partially or entirely covered by the user or any suitable object to vary the sounds emitted from the mouthpiece 21 or game calling device.

When the user exhales through the mouthpiece 21 or inner tubular member 41, the exhaled air from the user passes through the channel 123 before passing through the bore 128 of the reed support member 131 and is directed through the channel 123. As the moving air passes through the channel 123, the air excites the reed 81, causing the reed 81 to vibrate. The vibration of the reed 81 produces sounds that travels through the opened end 135 of the reed support member 131 to the external environment, or if the second external tubular member 71 is attached, through an outlet 73 of the second external tubular member 71 or the flexible and extendible tube 59.

Figure 12:
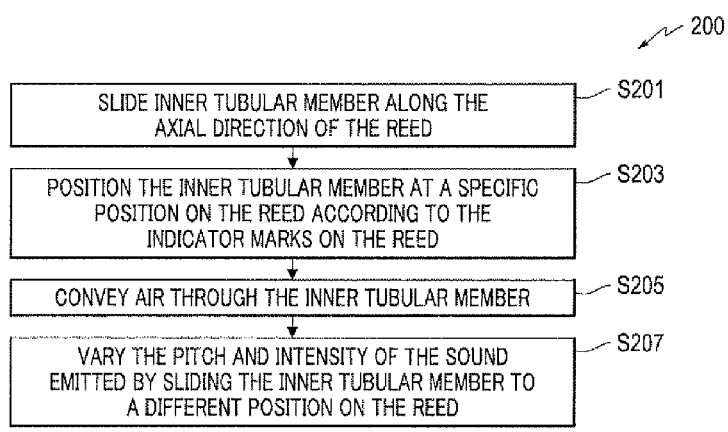
FIG. 12 is a flow diagram of a method of varying the sound and pitch of an exemplary game calling device.

As illustrated in FIG. 12, the sounds produced by the game calling device 13 can be varied in several ways. In one embodiment, the sounds may be varied as shown by the flow diagram 200. Sounds may be varied by sliding the inner tubular member 41 along the axial direction of the reed 81 (i.e., toward or away from the reed support member 131) (S201), positioning the inner tubular member 41 at a specific position on the reed 81 according to the indicator marks 115 on the reed 81 (S203) and conveying air through the inner tubular member 41 to cause the reed to vibrate and to produce a sound based on the position of the inner tubular member 41 on the reed that emanates from the open end 135 of the reed support member 131 (S205). Depending on the position of the inner tubular member 41 on the reed 81, sounds of varying pitch can be created (S207). Sounds may also be varied by directly pressing down on the indicator marks 113 on the exterior surface of the internal tubular member 41 without having to slide the inner tubular member 41. Further, on the barrel end 61 of the second external tubular member 71, air can be inhaled from the mouthpiece 21 or exhaled to create a desired sound or effect. Sounds may also be varied from the mouthpiece 21 used by itself.

Figure 13:
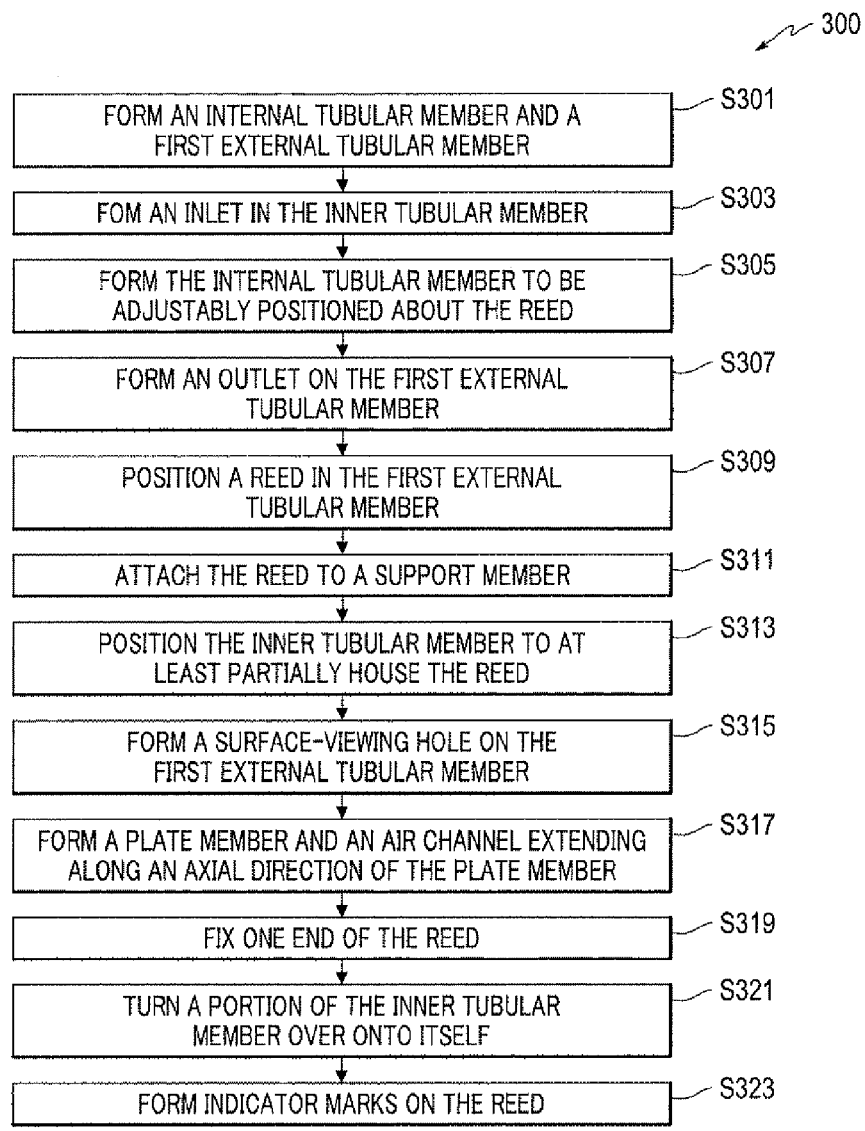
FIG. 13 is a flow diagram of a method of manufacturing an exemplary game calling device.

As illustrated in FIG. 13 the game calling device 13 may also be manufactured in various ways. According to one method, as shown by flow diagram 300, the game calling device 13 may be manufactured by forming the internal tubular member 41 and the first external tubular member 51 (S301). Forming the inner tubular member 41 may include forming an inlet that allows air to enter the inner tubular member 41 (S303) and forming the inner tubular member 41 to be adjustably positioned about the reed 81 (S305). Forming the first external tubular member 51 may also include forming an outlet so that the air that enters the inner tubular member is expelled through the outlet to emit a sound (S307). The reed 81 may be positioned in first external member 51 (S309) and attached to a reed support member 131 (S311). Further, the inner tubular member 41 may also be positioned to at least partially house the reed 81 (S313).

In order to view the positioning of the inner tubular member 41 on the reed 81, a surface-viewing hole is formed on the first external tubular member 51 (S315). A plate member 121 is also formed, having an air channel 123 that extends along an axial direction of the plate member 121 (S317). An end of the reed 81 may also be fixed to the plate member 121 and reed support member 131 so that an opposite end of the reed 81 is free to vibrate (S319). A portion of the inner tubular member 41 may also be turned over onto itself (S321) and indicator marks 113 may be formed on the reed 81 that designates different types of sounds that can be emitted based on the position of the inner tubular member 41 on the reed 81 (S325).

While this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. A game calling device comprising:
an external tubular member having a first end and an outlet;
a reed disposed within the external tubular member, the reed having a fixed end and a free end so that the reed vibrates in response to passing air, the free end of the reed located closer to the first end of the external tubular member than is the fixed end of the reed, and the fixed end of the reed located closer to the outlet of the external tubular member than is the free end of the reed; and
an inner tubular member having a first end and a second end, the first end being an inlet that allows air to enter the inner tubular member, the second end being inserted into the first end of the external tubular member and being adjustably disposed within the external tubular member so that the inner tubular member to at least partially houses the reed, wherein
the air that enters the inner tubular member from the first end of the inner tubular member vibrates the reed and is expelled through the outlet of the external tubular member to emit a sound, and
the inner tubular member is configured to be selectively positioned along an axial direction of the reed so that the emitted sound varies based at least on a position of the inner tubular member along the reed.

2. The game calling device of claim 1, wherein the external tubular member defines a surface-viewing hole that allows a user to visualize the position of the inner tubular member with respect to the reed and to press down on the inner tubular member to vary the emitted sound.

3. The game calling device of claim 1, wherein the reed comprises a plurality of indicator marks for positioning the inner tubular member, the indicator marks designating different sounds that can be emitted.

4. The game calling device of claim 1, further comprising a plate member disposed within the external tubular member and defining a channel extending along an axial direction of the plate member, wherein the reed is disposed over the channel of the plate member.

5. The game calling device of claim 4, wherein the reed has a first end that is fixed to the plate member and an opposite end that is free to vibrate.

6. The game calling device of claim 5, wherein the second end of the inner tubular member holds the reed against the plate member.

7. The game calling device of claim 4, further comprising a support member that supports the reed and the plate member and that positions the reed and the plate member within the external tubular member.

8. The game calling device of claim 1, wherein the inner tubular member is tapered between the first end and the second end.

9. The game calling device of claim 1, further comprising a mouthpiece removably attached at the inlet of the inner tubular member.

10. The game calling device of claim 1, further comprising a mouthpiece that is integrally formed with the inner tubular member to form a unitary structure.

11. The game calling device of claim 1, wherein the external tubular member further comprises attaching portions configured to attach the game calling device to a user.

12. The game calling device of claim 1, wherein the inner tubular member is configured to be removable from the external tubular member.

13. The game calling device of claim 1, wherein the selectively positioned inner tubular member along the axial direction of the reed allows for hands-free use of the game calling device.

14. The game calling device of claim 1, wherein the fixed end of the reed is fixed to the external tubular member so that the reed does not move longitudinally relative to the external tubular member.

15. A game calling device comprising:
an external tubular member having an outlet;
a reed disposed within the external tubular member, and that vibrates in response to passing air; and
an inner tubular member adjustably disposed at least partially within the external tubular member and to at least partially house the reed, and having a first end and a second end, the first end being an inlet that allows air to enter the inner tubular member, wherein
the air that enters the inner tubular member vibrates the reed and is expelled through the outlet of the external tubular member to emit a sound,
the inner tubular member is configured to be selectively positioned along an axial direction of the reed so that the emitted sound varies based at least on a position of the inner tubular member along the reed, and
inner tubular member is flexible.

16. The game calling device of claim 15, wherein the inner tubular member is invertible such that at least a portion of the inner tubular member can be turned over onto itself.

17. A method of varying sounds with a game calling device, the game calling device having (i) an external tubular member having a first end and an outlet, (ii) a reed disposed within the external tubular member, the reed having a fixed end and a free end so that the reed vibrates in response to passing air, the free end of the reed located closer to the first end of the external tubular member than is the fixed end of the reed, and the fixed end of the reed located closer to the outlet of the external tubular member than is the free end of the reed, and (iii) an inner tubular member having a first end and a second end, the first end being an inlet that allows air to enter the inner tubular member, the second end being inserted into the first end of the external tubular member and being adjustably disposed within the external tubular member so that the inner tubular member at least partially houses the reed, the method comprising:

- sliding at least the second end of the inner tubular member within the external tubular member along an axial direction of the reed;
- selectively positioning the second end of the inner tubular member at a specific position on the reed; and
- conveying air from the first end of the inner tubular member through the inner tubular member, thereby causing the reed to vibrate and to produce a sound based on the position of the inner tubular member on the reed, the sound emanating from the outlet of the external tubular member.

18. The method of claim 17, wherein the fixed end of the reed is fixed to the external tubular member so that the reed does not move longitudinally relative to the external tubular member.

19. A method of manufacturing a game calling device, the method comprising:

- forming an inner tubular member and an external tubular member;
- positioning a reed in the external tubular member, the reed having a fixed end and a free end so that the reed vibrates in response to passing air; and
- positioning the inner tubular member at least partially within the external tubular member to at least partially house the reed, wherein the forming the inner tubular member includes (1) forming a first end of the inner tubular member as an inlet that allows air to enter the inner tubular member, (2) forming an opening at a second end of the inner tubular member which is opposite the first end of the inner tubular member, and (3) forming the inner tubular member to be adjustably movable within the external tubular member so as to be adjustably positioned about the reed, the forming the external tubular member includes forming a first end and an outlet, positioning the reed in the external tubular member includes positioning the reed so that the free end of the reed is located closer to the first end of the external tubular member than is the fixed end of the reed, and the fixed end of the reed is located closer to the outlet of the external tubular member than is the free end of the reed, and the positioning the inner tubular member at least partially within the external tubular member includes inserting the second end of the inner tubular member into the first end of the external tubular member until the reed is at least partially housed within the inner tubular member so that the air that enters the inner tubular member from the first end of the inner tubular member is expelled through the outlet of the external tubular member to emit a sound.

20. The method of claim 19, further comprising forming a surface-viewing hole in the external tubular member to allow a user to visualize the position of the inner tubular member with respect to the reed.

21. The method of claim 19, further comprising:

- forming a plate member defining an air channel extending along an axial direction of the plate member;
- fixing one end of the reed to the plate member so that an opposite end of the reed is free to vibrate; and
- placing the plate member and the reed fixed to the plate member within the external tubular member.

22. The method of claim 19, further comprising turning over at least a portion of the inner tubular member onto itself.

23. The method of claim 19, further comprising forming indicator marks on the reed that designate different types of sounds that can be emitted based on the positioning of the inner tubular member on the reed.

24. The method of claim 19, wherein the fixed end of the reed is fixed to the external tubular member so that the reed does not move longitudinally relative to the external tubular member.

* * * * *